July 16, 1940.   J. E. WHITE   2,207,769
TELEMETRIC SYSTEM
Filed Nov. 9, 1937   2 Sheets-Sheet 2

A-A

Jud E. White
INVENTOR
BY Arthur E. Davis
ATTORNEY

Patented July 16, 1940

2,207,769

UNITED STATES PATENT OFFICE 2,207,769

TELEMETRIC SYSTEM

Jud E. White, Knoxville, Tenn.

Application November 9, 1937, Serial No. 173,632

3 Claims. (Cl. 177—351)

(Granted under the act of March 3, 1883, as amended April 30, 1928; 370 O. G. 757)

The invention herein described may be manufactured and used by or for the Government for governmental purposes without the payment to me of any royalty thereon.

This invention relates to means for indicating liquid levels particularly in respect to stream levels.

The principal object of this invention is to indicate a liquid level at one location and to transmit the level so indicated to a distant location. Another object of this invention is to provide an improved float which moves in one or the other direction along its predetermined path, its arrival at any position being electrically indicated and signalled. A further object of this invention is to provide a mechanism to transmit the various signals indicating the changing position of the float by the use of a plurality of electrical circuits. Another object of this invention is to provide a mechanism for indicating and transmitting the indication of varying liquid levels to a distant location by the use of a single source of energy. Another object of this invention is to provide an apparatus for transmitting an indication of liquid level to a distant location at predetermined intervals. Another object of this invention is to provide an apparatus for the transmitting of integral indications of liquid levels to a distant location without the necessity of transmitting the indication of the fractional units which make up the integer. Another object of this invention is to provide an apparatus for transmitting the liquid level indicated at one location to another location at predetermined intervals in which the indication of the liquid level transmitted is preceded by the call letters identifying the station supplying the indication.

I have discovered an apparatus for indicating the liquid level at one location and transmitting the indication to a distant location, which includes the combination of a float operated selector with an electrical conductor, electrically connected to an electrical current supply, which makes contact with a plurality of contact elements when a revolving drum provided with projection strips operates the contact elements, closing and opening a plurality of electrical circuits; a keyer, having a keyer motor, driving a revolving keyer arm which successively contacts a plurality of keyer contact elements corresponding in number to the selector contact elements; an electrical conductor between each selector contact element and a respective keyer contact element; an electrical current supply operated by remote control, to the keyer motor; an intelligence transmitting circuit; an electrical conductor between the selector conducting element and the electrical current supply; an electrical current supply circuit for the transmitting circuit; a relay in the circuit closed by the keyer contact elements for closing the electrical current supply for the transmitting circuit; and a receiver for intercepting the signals emitted by the electrical current transmitting circuit when the keyer arm revolves and the relay closes successively on contact of the keyer arm with the respective keyer contact elements.

In the accompanying drawings, which form a part of the specification, and wherein reference symbols refer to like parts wherever they occur, Fig. 1 is a diagrammatic view of one form of apparatus for the embodiment of my invention.

Figure 1:
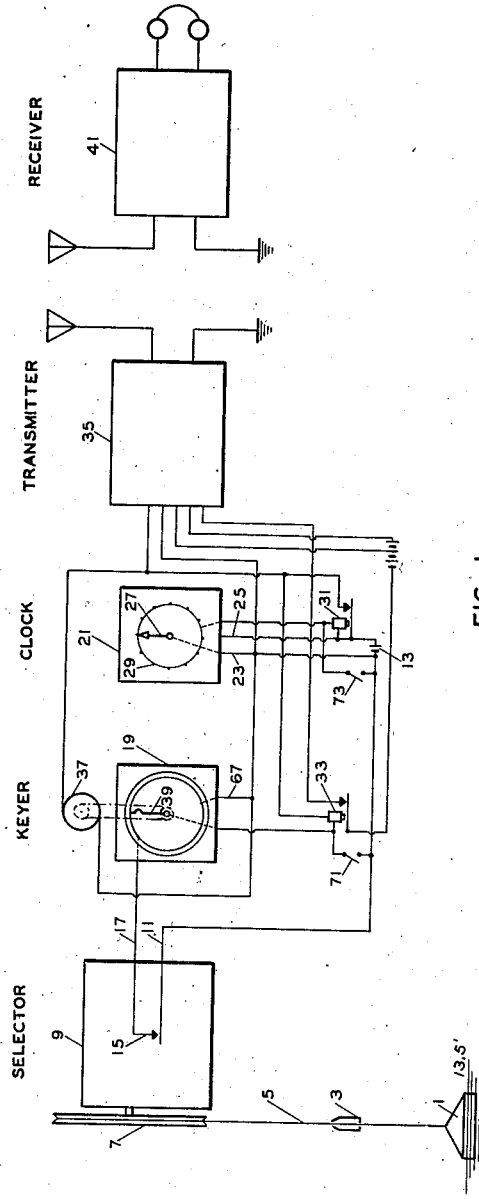

In Fig. 1, the combination of float 1, and the counter weight 3, attached to the ends of a steel wire cable 5, operate the float wheel 7, which in turn revolves the drum in the selector 9, closing a circuit between the electrical conductor 11, from a power supply 13, and the plurality of individually connected contact fingers corresponding to the liquid level indication, represented by contact finger 15, connected by the cable 17, to the keyer 19. A solenoid wound clock 21, energized by conductors 23 and 25 from the power supply 13, turns on the apparatus at predetermined times when the hand 27, moves on one of the plurality of contacts, represented by contact 29, thereby energizing the master relay 31, which energizes simultaneously the circuit for the transmitter 35, the keyer 19, and the keyer motor 37. The keyer 19, operated by the keyer motor 37, from the power supply 13, revolves the keyer arm 39 clockwise, alternately closing and opening the circuit to the relay 33, and thereby conveying electrical impulses corresponding to the identification of the station and the liquid level indication to the transmitter 35. The electrical impulses from the transmitter 35, are intercepted by a receiver 41.

Figure 2:
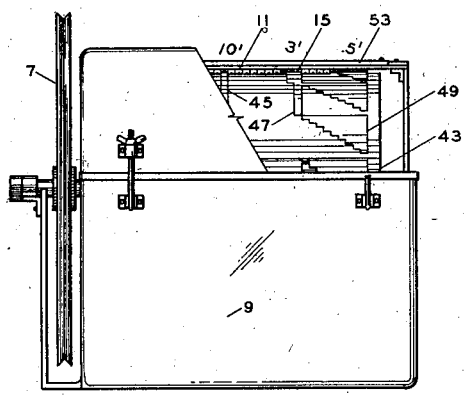
Fig. 2 is a vertical view of the selector with a portion of the top omitted to show the drum therein.
Figure 3:
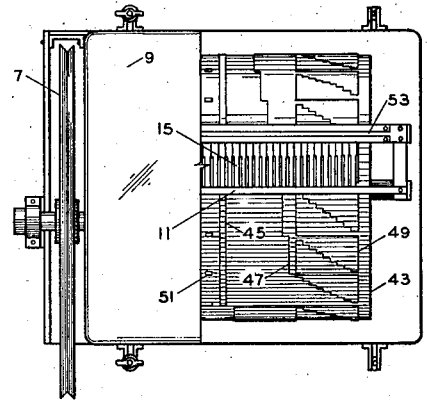
Fig. 3 is a plan view of the selector with a portion of the top omitted to show the drum therein.

In Figs. 1, 2, and 3, the float wheel 7, of the selector 9, is geared to the drum 43, revolving the same, said drum being provided with a plurality of projection strips represented by projection strips 45, 47 and 49, which correspond to 10 feet indications, feet indications and tenths of a foot indications respectively. Thus, except for the ten-foot strip, the drum is the same on each half with one revolution of the drum equivalent to a change in liquid level of 20 feet and the number of revolutions of the drum being unlimited, thereby giving the apparatus unlimited range. A plurality of short projection strips, represented by projection strip 51, are placed exactly opposite the foot indication projection strips and short circuit the tenths of a foot indication signals simultaneously when an integral foot indication registers. In like manner, a projection strip is provided exactly opposite the ten foot indication projection to short circuit the foot indication signals when an integral 10 feet indication registers. When the drum 43, is revolved, the plurality of projection strips cause a plurality of contact fingers, represented by contact finger 15, individually mounted and insulated from each other on the insulation bar 53, to raise and make contact with the electrical conductor 11. The plurality of contact fingers, represented by contact finger 15, are connected by the cable 17 to the keyer 19.

In Figs. 1, 5, 6, and 7, the plurality of conductors, included in cable 17, from the selector 9, are connected to a plurality of tip jacks, represented . — — p . . . p . . . . p — . — . p . . — . . p — p — — — p p p p p p p — — — . — — p p p p p
  W       S       H       J       2     10'  3'                        .5' by tip jack 55, on top of the keyer 19. These tip jacks are connected by a plurality of conductors represented by conductor 57, to a plurality of contact points, represented by contact point 59, located on the rim of the keyer dial. A pair of shorting bars 61, are each connected by a conductor 63, to a tip jack 55, said shorting bars functioning with an integral unit of measurement of the reading, which also corresponds to the short projection strips 51. These shorting . — — p . . . p . . . . p — . — . p . . — . . p p p p p p p p p p p p p — — — . — — p p p p p
  W       S       H       J       2                                  .5' bars are provided to cause a short circuit which shorts the fractional unit of measurement of the indication and gives a long dash as the signal for the zero indication. The revolving keyer arm 39, driven by keyer motor 37, moving in a clockwise direction around the keyer dial, makes successive . — — p . . . p . . . . p — . — . p . . — . . p p p — — — p p p p p p p ———— p
  W       S       H       J       2          3'                     0 contact with a plurality of contacts, represented by contact 65, of widths so arranged as to create electrical impulses which transmit the call letters of the station in dots and dashes. The contact 65, connected by conductor 67, completes a circuit so that the call letters will be transmitted periodically each time the circuit is energized independent of the operation of the selector circuit. The keyer arm 39, continuing its clockwise revolution around the keyer dial, makes contact with the plurality of contact points, represented by contact point 59, and each of the shorting bars 61, in turn creating electrical impulses which transmit the reading of liquid level in 10 feet, feet, and tenths of a foot respectively. The supporting bracket 69, supports a plurality of conductors, conveyed by cable 17, and holds the latter securely in place at the top of the keyer 19, adjacent to the plurality of tip jacks represented by tip jack 55. A switch 71 and a switch 73 are provided in the circuit for manual operation of the station during inspection periods.

Figure 4:
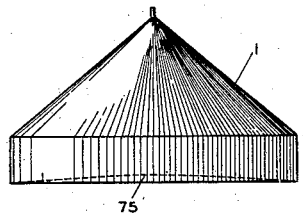
Fig. 4 is a vertical view of the float.
Figure 5:
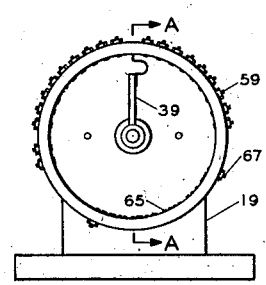
Fig. 5 is a vertical view of the keyer.
Figure 6:
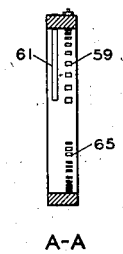
Fig. 6 is a vertical sectional view through the dial of the keyer as shown in section A—A, Fig. 5.
Figure 7:
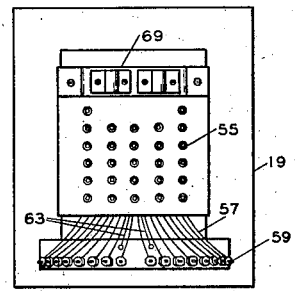
Fig. 7 is a plan view of the keyer.

In Figs. 1 and 4, the float 1, has a concave bottom 75, which gives increased efficiency, particularly on receding liquid levels, as the concave bottom creates a partial vacuum, which insures better operation on slight fluctuations, particularly when the frictional resistance of the selector and float weight approach unity.

One example of the operation of my invention is given using the apparatus described above. When the hour hand of the timer moves to the next successive contact located therein, the relay 31, is energized, closing the circuit for energizing the transmitter 35, and the keyer motor 37. As the keyer motor rotates the keyer arm 39, the latter contacts successively, all of the station call letter contacts 65, all of the liquid level indication contacts 59, which correspond to the total range of predetermined liquid levels and the shorting bars 61. The signals transmitted successively for the call letters of the station WSHJ2 in American Morse code, and the liquid level indication of 13.5 feet, as shown in the drawings, are as follows:

With · representing a dot, with — representing a dash, and with p representing a pause between the signals representing the respective letters and numbers. This series of signals is repeated a predetermined number of times, sufficient for the receiver to accurately identify the signals transmitted.

A second example of the signals transmitted successively for a liquid level indication of 0.5 foot is as follows:

A third example of the signals transmitted successively for a liquid level indication of exactly 3.0 feet is as follows:

A fourth example of the signals transmitted successively for a liquid level indication of exactly 10.0 feet is as follows:

. — — p . . . p . . . . p — . — . p . . — . . p — p ——— p ——— p
  W       S       H       J       2   10'    0      0

It is evident that there are numerous factors which will influence conditions for the most satisfactory operation of my invention, the actual limitations of which cannot be established except by a detailed study of each set of conditions under which this invention is to be operated.

Any conventional float may be used to initiate the ultimate response which is produced, however, it is preferred to use a float which is novel in the respect that it has a concave bottom with the edges of the concave bottom lying in the same plane perpendicular to the vertical axis of the float. This is of particular importance in obtaining an immediate and accurate indication of the liquid level when the latter is receding; also where the liquid level is being indicated in a relatively large body of liquid, it is not uncommon for the surface of the liquid to be in alternating motion such as caused by ripples, waves or swirls. This improvement in construction of the float minimizes the intensity of such momentary variations.

The float is connected to a cable, which passes over a float wheel, and is counter-balanced. This is one of a variety of well known methods by which the float may be used to actuate the revolving drum in the selector.

The revolving drum in the selector is provided with a suitable contact means for completing electrical circuits which indicate predetermined heights of liquid level. One means of accomplishing this result is to provide the drum with a plurality of projection strips which correspond to 10 feet indications feet indications and tenths of a foot indications. By appropriate gearing, the revolution of the drum may be equivalent to any desired change in liquid level. For example, in a number of installations which are now in operation, one revolution of the drum is equivalent to a change in liquid level of 20 feet. It will be seen that the number of revolutions of the drum is unlimited, thereby giving the apparatus a corresponding range. Projection strips corresponding to the aforementioned projection strips on the drum are placed opposite the feet indication projection strips and short circuit the tenths of a foot indication signals simultaneously when an integral foot indication registers. In like manner, a projection strip is provided exactly opposite the ten feet indication projection to short circuit the feet indication signals when an integral 10 feet indication registers. When the drum is revolved the plurality of projection strips thereon cause a plurality of contact fingers individually mounted and insulated from each other above the drum to raise and make contact so that the electrical circuit is complete. The conductors over which these electrical currents pass are connected between the respective contact fingers and a keyer.

The keyer may be any suitable mechanism for assisting in the completion of the circuit from the selector to a transmitting apparatus. It is provided with a keyer arm, which when rotated by suitable means, contacts successively, elements which correspond to predetermined heights of liquid level. For purposes of identifying the station from which the indication is transmitted, the keyer is provided with additional contacts, which correspond to the call letters of the station in code, with the arrangement being such that the call letters precede the transmission of the indication of liquid level.

It is obvious that with continuous rotation of the keyer arm at a predetermined rate, a substantially continuous set of indications of liquid level could be transmitted. However, for practical purposes, including economy, it is only necessary to transmit such indications at predetermined intervals. This is readily accomplished by the use of a timer which contains a plurality of contact elements, each of which is set to correspond to a time at which a series of indications of liquid level is to be transmitted. The timer is also so connected that at the time of making such contacts the transmitter is energized and the keyer is energized, that is, the motor operating the keyer is operated so that the successive series of call letter code and liquid level indications are sent for a sufficient length of time for them to be received and recorded accurately.

When the keyer arm contacts a keyer contact element a circuit through the keyer is closed operating a relay in series with the transmitter, thereby transmitting a signal through the transmitter to the distant point which corresponds to the length and location of the contact on the keyer.

The transmitter used will depend upon the accessibility of the station from which the original indication is made, the distance through which the signal is to be transmitted and the character of the power facilities adjacent to both the former and the latter. Where the transmitting station is at a relatively inaccessible point, it is preferable to use a short wave radio frequency transmitter with a self-contained portable power supply such as a storage battery or storage batteries. Where power lines or lines for the communication of intelligence are adjacent to the transmitting station direct current or alternating current of suitable frequency may be used.

The receiver used will, of course, correspond to the means in which the indications are transmitted. Since all the indications, both of the call letters of the station and the indications of liquid level, are transmitted in code, it is necessary to translate these readings in accordance with the predetermined code used so the indications may be available for ordinary use.

It will be seen, therefore, that this invention actually may be carried out by the use of various modifications and changes without departing from its spirit and scope, with only such limitations placed thereon as are imposed by the prior art.

I claim:

1. A telemetric circuit having in combination circuit elements forming a plurality of circuits adapted to be opened and closed by a unitary rotatable member; means for moving said member in accordance with the fluctuation of a variable quantity; means for electrically energizing said circuits; means for transmitting a radio frequency signal; means energized by said circuits for periodically modifying the transmitted radio frequency signal; and a receiver adapted to receive the transmitted radio frequency signals and including an indicating device responsive to the modulations of the received signals.

2. A telemetric circuit having in combination circuit elements forming a plurality of circuits adapted to be operated by a rotatable member, which circuits include a plurality of contact elements actuated by a plurality of projections integral with said rotatable member; means for moving said member in accordance with the fluctuation of a variable quantity; means for electrically energizing said circuits; means for transmitting a radio frequency signal energized by those of said circuits whose gaps are closed by the projections integral with said movable member; means energized by said circuits for periodically modifying the transmitted radio frequency signal; and a receiver adapted to receive the transmitted radio frequency signals and including an indicating device responsive to the modulations of the received signals.

3. A telemetric circuit having in combination circuit elements forming a plurality of circuits, which circuits include elements positioned at successive spaced intervals for cooperation with the projections on an insulated rotatable member adapted to actuate said elements to alter the electrical characteristics of the corresponding circuit; means for electrically energizing said circuits; means for transmitting a radio frequency signal; means energized by said circuits for periodically modifying the transmitted radio frequency signal; and a receiver adapted to receive the transmitted radio frequency signals and including an indicating device responsive to the modulations of the received signals.

JUD E. WHITE.